Aug. 29, 1950          L. BEEMAN          2,520,708
ELECTROMAGNETIC CIRCUIT CONTROLLER
Filed Feb. 22, 1943          6 Sheets-Sheet 1
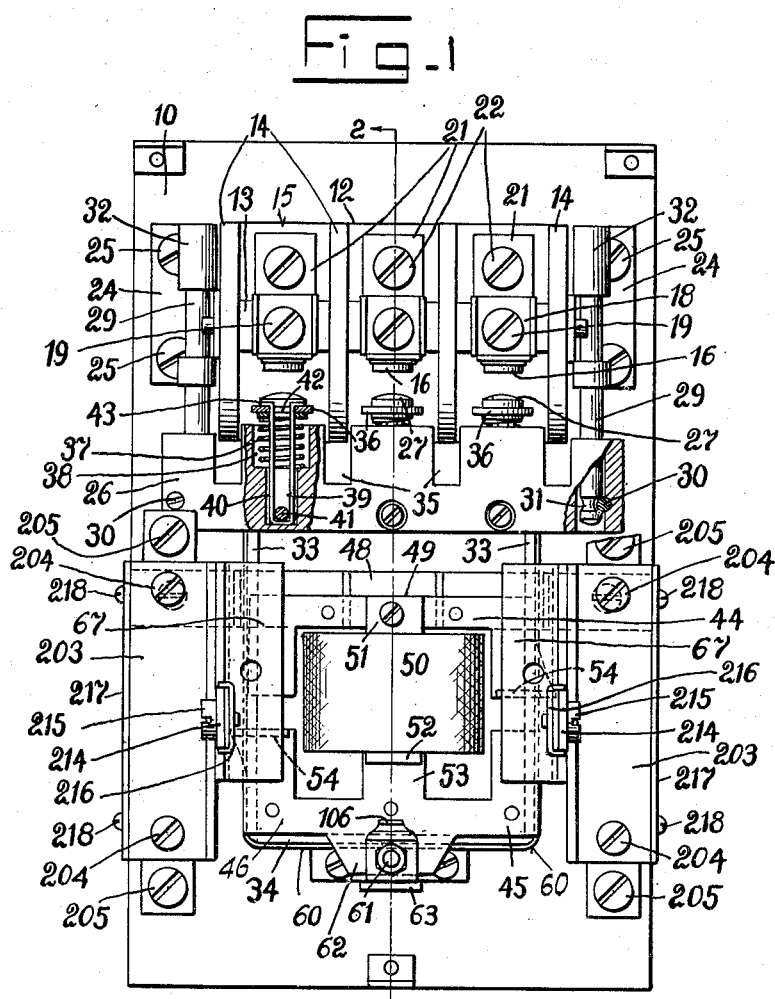
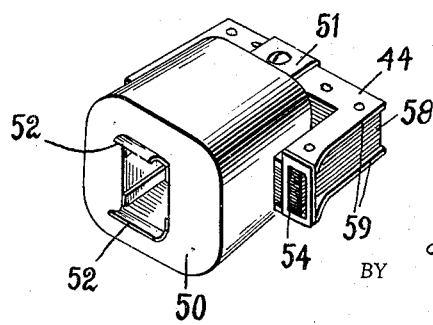
INVENTOR.
Lyle Beeman
BY
Ralph W. Brown
ATTORNEY.

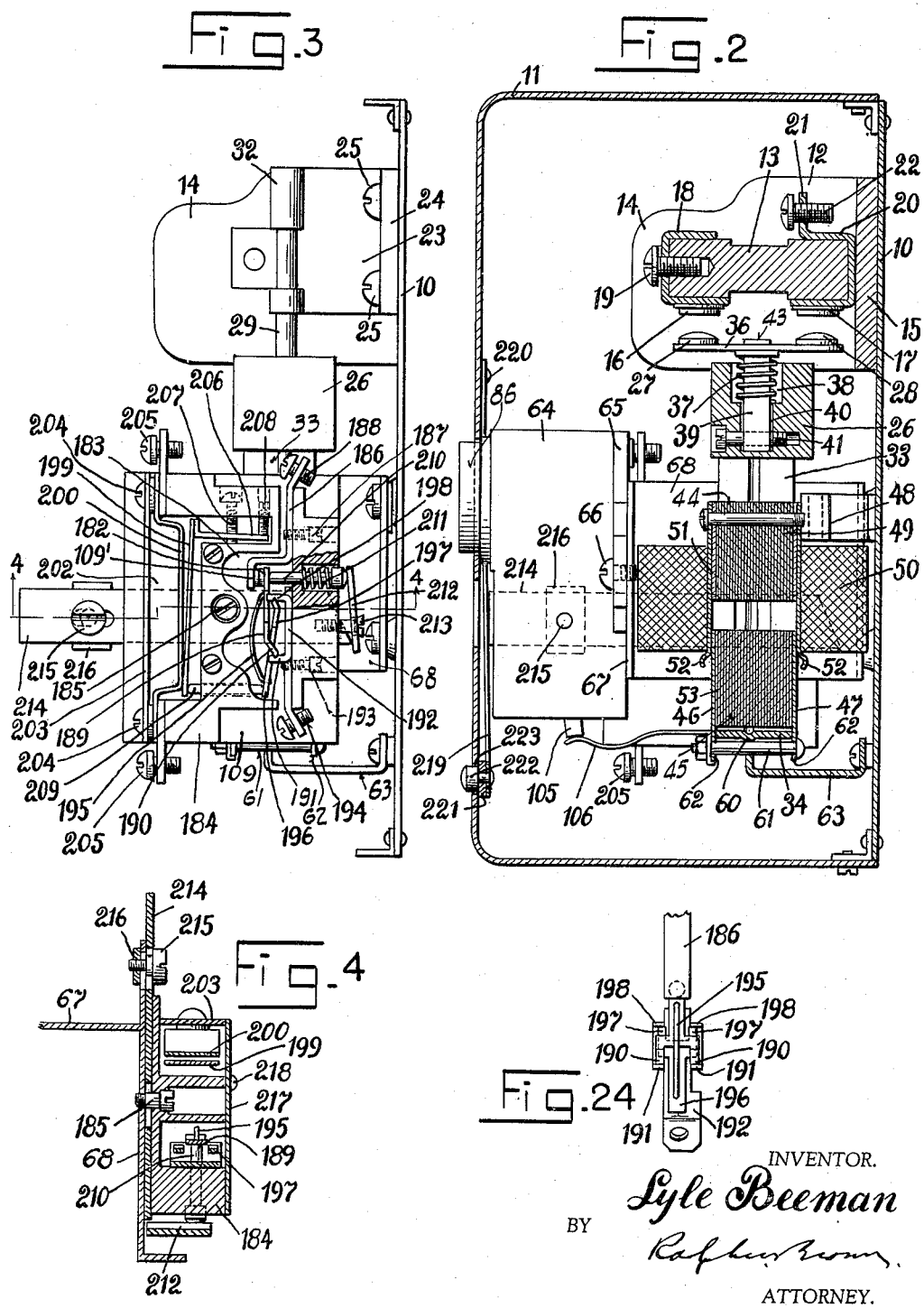

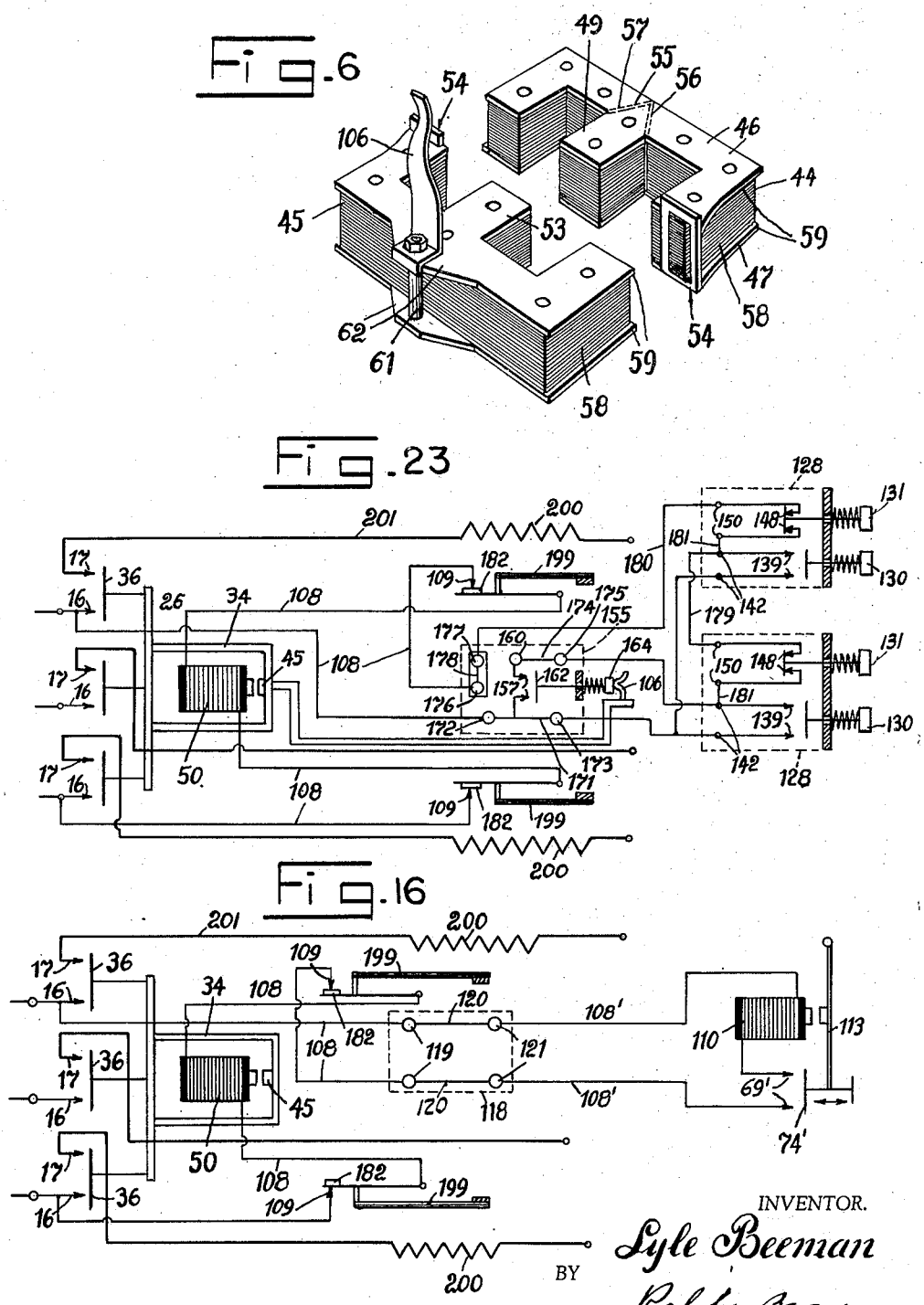

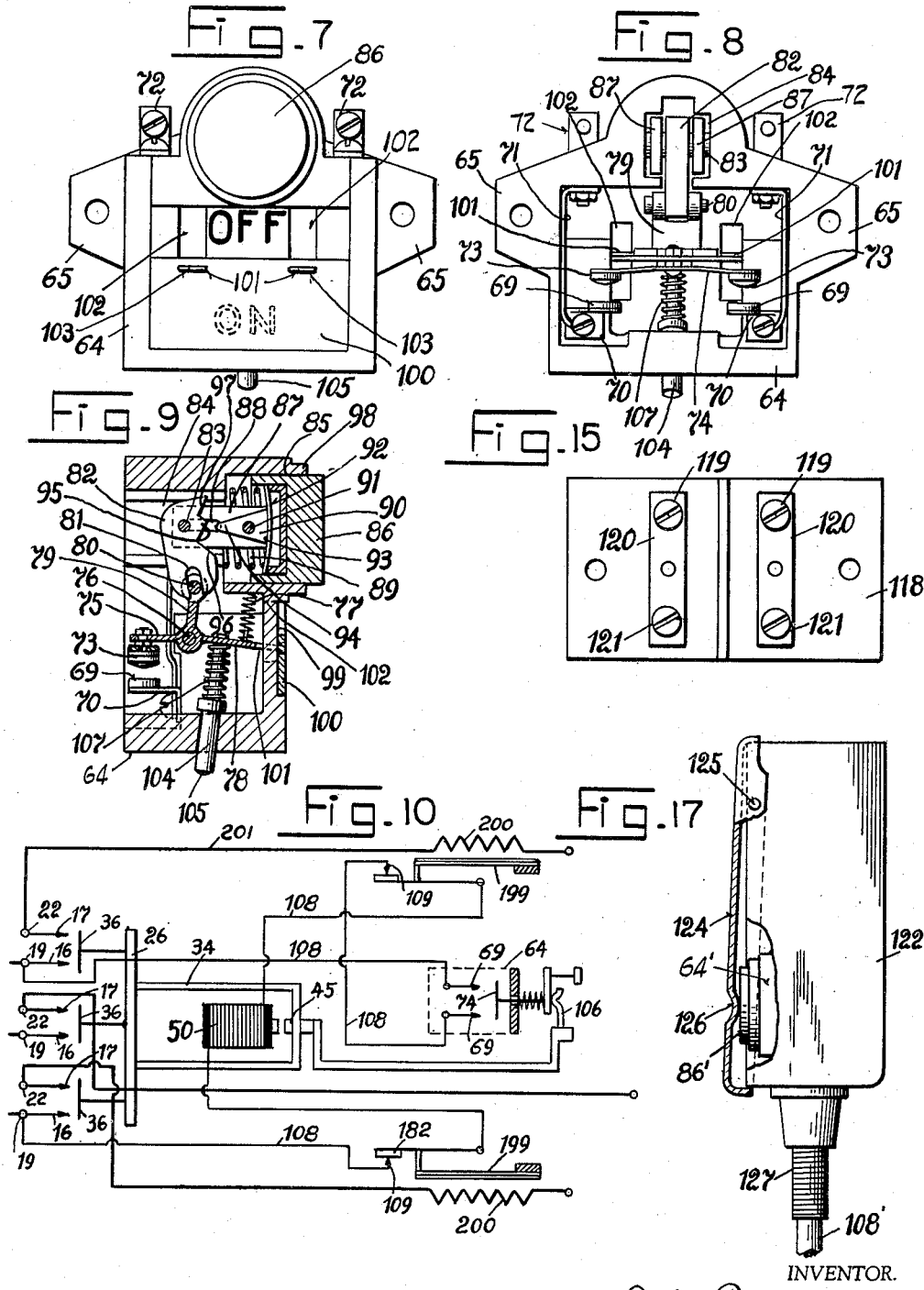

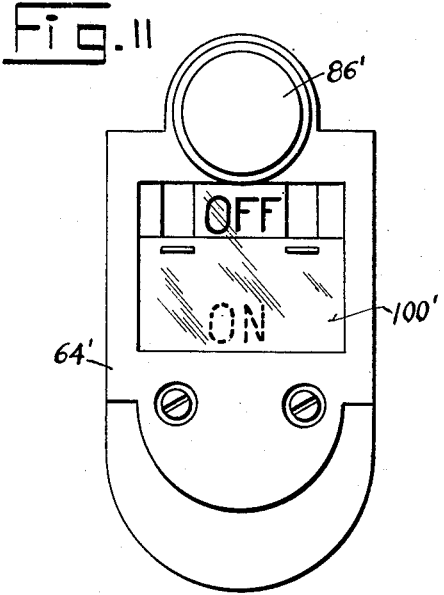
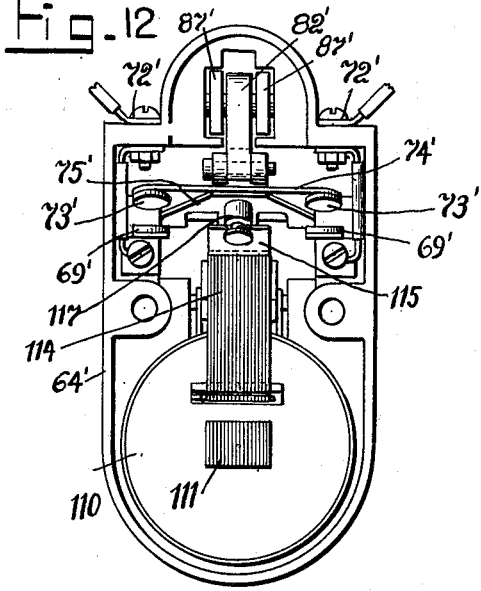
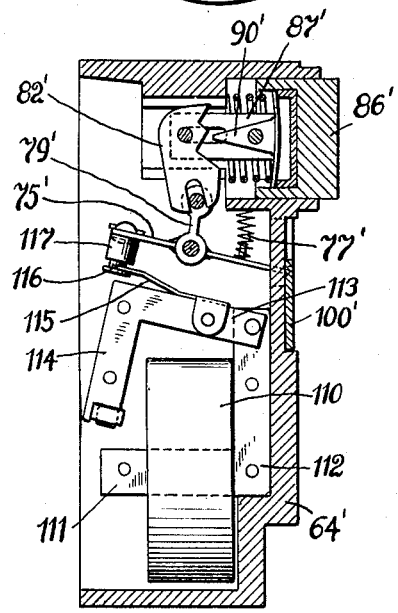
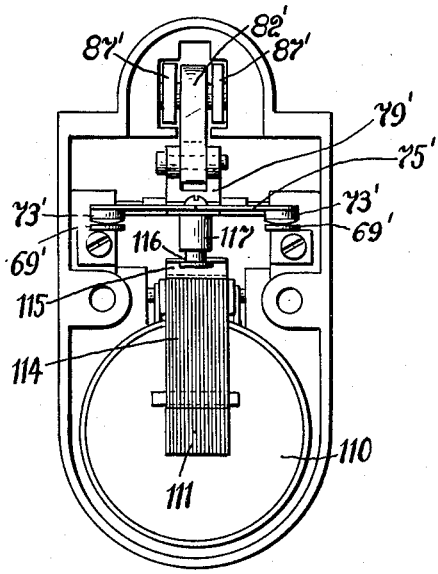

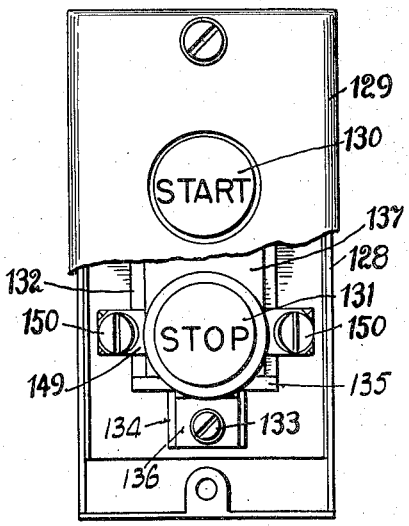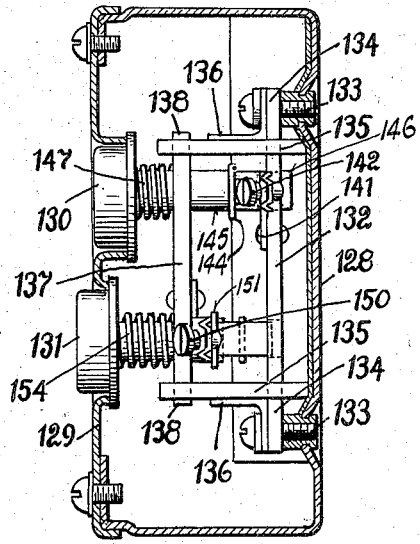

Patented Aug. 29, 1950

2,520,708

UNITED STATES PATENT OFFICE 2,520,708

ELECTROMAGNETIC CIRCUIT CONTROLLER

Lyle Beeman, Ann Arbor, Mich., assignor to The Master Electric Company, Dayton, Ohio, a corporation of Ohio Application February 22, 1943, Serial No. 476,667

3 Claims. (Cl. 175—294)

1

This invention relates to electromagnetic controllers for electric motors and the like.

This application is a continuation in part of my copending application Serial No. 282,857, filed July 5, 1939, and which has matured into Patent No. 2,371,601.

My said copending application discloses an improved electromagnetic controller in which a single pilot switch performs the dual function of a start and stop switch.

One object of the present invention is to further improve the construction and operation of controllers of the type shown in said application.

A more specific object is to provide an electromagnetic controller in which the main switch mechanism is rendered responsive to the electromagnetic actuator by a direct action so transmitted as to permit a free self-centering adjustment between the actuator parts.

Another object is to provide an electromagnetic controller in which alignment between the main switch parts is accurately maintained without interfering with a free self-aligning action between the parts of the electromagnetic actuator.

Another object is to provide an electromagnetic controller of simple compact design in which all the essential parts are readily accessible for inspection and readily removable for replacement or repair.

Another object is to provide an electromagnetic controller having a single button control switch an automatic indicator for showing whether the switch is open or closed.

Another object is to provide a simplified and improved single-button control switch for electromagnetic controllers.

Another object is to provide a single-button control switch for electromagnetic controllers in which the start stroke of the control button is greater than the stop stroke thereof.

Another object is to provide an improved unitary control switch for electromagnetic controllers capable of functioning as a start switch a stop switch and a holding switch whether applied directly to the electromagnetic controller or at a remote control station.

Another object is to provide a unitary control switch having electrical means for holding the same closed automatically so long as the electromagnetic actuator of the main switch is energized.

Another object is to provide remote control switch mechanism of compact, simplified and improved construction.

Another object is to provide in an electromagnetic controller an improved holding switch therefor for use with remote control switches.

Other more specific objects and advantages will appear, expressed or implied, from the following description of an electromagnetic controller embodying the present invention.

In the accompanying drawings:

Figure 1 is a front elevation of an electromagnetic circuit controller constructed in accordance with the present invention.

Fig. 2 is a vertical section taken substantially along the line 2—2 of Fig. 1.

Fig. 3 is a side elevation.

Fig. 4 is a fragmentary transverse section taken substantially along the line 4—4 of Fig. 3.

Fig. 5 is a detail view in perspective of the energizing coil shown in Fig. 1.

Fig. 6 is a detail view in perspective of the coacting sections of the electromagnet.

Fig. 7 is a front elevation of the control switch shown in Fig. 2.

Fig. 8 is a rear view of the control switch of Fig. 7.

Fig. 9 is a vertical sectional view of the same control switch.

Fig. 10 is a circuit diagram including the control switch of Figs. 7, 8 and 9.

Fig. 11 is a front elevation of a remote control switch for one remote station.

Figs. 12 and 13 are rear elevations of the control switch shown in Fig. 11 illustrating the same in open and closed condition, respectively.

Fig. 14 is a vertical sectional view of the control switch shown in Fig. 11.

Fig. 15 is a face view of a terminal panel for use with the control switch of Fig. 11.

Fig. 16 is a circuit diagram including the terminal panel and control switch of Fig. 11.

Fig. 17 is a side elevation of another form of remote control switch.

Fig. 18 is a front elevation of another form of remote control switch for a plurality of stations.

Fig. 19 is a vertical section and Fig. 20 a transverse section of the control switch shown in Fig. 18.

Fig. 21 is a front elevation and Fig. 22 a rear elevation of a holding switch for use with the control switch shown in Fig. 18.

Fig. 23 is a circuit diagram including the control switch and holding switch shown in Figs. 18 and 21 respectively.

Fig. 24 is a plan view of the overload snap switch shown in Fig. 3.

The electromagnetic controller selected for illustration is shown carried by a mounting plate 10 removably attached to and within an appropriate housing 11 and constituting a vertical back panel and closure for the rear of the housing.

The plate 10 carries a terminal block 12 of appropriate non-conducting material, such as Bakelite or other suitable plastic. In this instance the block 12 is molded to provide a horizontally extended bar 13 having a plurality of vertical fins or separator plates 14 projecting therefrom and seated on a base plate 15 of like material. The separator plates 14 cooperate with the bar 13 and bar plate 15 to form separated cells each containing a pair of stationary switch contacts 16 and 17.

The forward switch contact 16 of each pair is carried by one leg of a U-shaped conductor strip 18 embracing the forward edge of the bar 13 and fixed in place by a screw 19 which also serves as a binding post for connection with one side of an electric power circuit. The other switch contact 17 is similarly carried by one leg of a U-shaped conductor strip 20 embracing the rear edge of the bar 13 and confined by the plate 15, the other leg of the strip 20 having an upwardly bent portion 21 adapted to receive and support a second binding post 22 for connection with one side of a motor or other work circuit.

The terminal block 12 is rigidly secured to the mounting plate 10 by appropriate means, such as a pair of bracket plates 23, each fixed to an end plate 14 thereof and each bent to provide a mounting flange 24 detachably fixed to the mounting plate 10 by screws 25 or the like.

The terminal block 12 also provides support for a movable cross-head in the form of a horizontally extended bar 26 of non-conducting material carrying pairs of movable switch contacts 27 and 28 for coaction with the above mentioned pairs of stationary contacts 16 and 17 respectively. In this instance the cross-head is guided by two vertical slide pins 29, each projecting downwardly into an end of the cross-head and releasably secured therein by appropriate means such as a screw 30 engaged in a groove 31 in the pin. Each pin 29 is fitted for free lengthwise movement within a pair of appropriate guides 32 which in this instance are formed by striking up and suitably bending portions of each bracket plate 23. The cross-head 26 also normally rests freely upon the upper ends 33 of a U-shaped actuator frame 34 to be hereinafter described, and it is recessed, as at 35, to accommodate the separator plates 14.

Each pair of movable contacts 27 and 28 is carried by the opposite ends of a bridge member 36 of copper or other good conducting material. Each bridge member is supported intermediate its ends upon a coiled spring 37 seated in and projecting from a socket 38 formed in the cross-head 26 and retained in place by an appropriate tie member in the form of a U-shaped spring clip 39. The lower end of each tie member 39 is seated in a square socket 40 formed in the cross-head 26 and is releasably retained in place by a screw 41 or the like extending transversely therethrough. Each tie member extends upwardly through a square opening 42 in the bridge member 36, and the upper ends of its legs are bent outwardly in opposite directions to form fingers 43 which coact with the top face of the bridge member to limit the upward movement thereof relative to the cross-head 26. Each bridge piece 36 may be readily removed by pinching together the legs of the tie member 39 so as to permit the fingers 43 thereof to pass through the opening 42. In that way any bridge piece 36 with its switch contacts 27 and 28 may be readily removed for replacement, cleaning or repair.

The mounting plate 10 also provides support for an electromagnet by which the cross-head 26 is actuated. The electromagnet shown comprises an E-shaped stationary field section 44 coacting with a similarly shaped movable armature section 45, both being composed of laminations of magnetic material riveted together between upper and lower frame plates 46 and 47, respectively.

The stationary section 44 is carried by an appropriate mounting bracket 48, attached to the plate 10, and its center leg 49 provides support for an energizing coil 50 surrounding the same. In this instance the coil 50 is positioned by a pair of outwardly biased spring clips 51 extending therethrough. The clips 51 are bolted or otherwise fixed at one end to the field section 44, extend lengthwise of and beyond the center leg 49 thereof, and are bent at their other ends to provide outward protuberances 52 by which the coil 50 is releasably retained, as indicated particularly in Figs. 2 and 5. It will be noted that the coil 50 may be readily removed for replacement or repair by forcing the same axially over the protuberances 52. The movable armature section 45 has a central leg 53 projecting into the coil and guided by and between the clips 51.

As indicated particularly in Fig. 6, one or both magnet sections 44 and 45 are preferably equipped with appropriate shading coils 54 and, in order to avoid residual magnetism and consequent objectionable sticking between the magnet sections, one or both sections are preferably constructed to incorporate an air gap therein. In this instance, the laminations contained in the center leg 49 or 53 of each section are separately formed and terminated in V-shaped ends 55 which project into a V-shaped recess formed by and between the diagonally cut ends of adjacent laminations, thereby providing two minute air gaps 56 and 57 within the magnet section. The laminations within the center leg are preferably magnetically separated from the outer frame plates 46 and 47 by sheets of copper or other non-magnetic material interposed between them and said plates and the rivets by which the laminations and plates are bound together are preferably of non-magnetic material for the same purpose.

Motion is imparted to the switch-carrying cross-head 26 from the movable armature section 45 preferably in such manner as to leave the latter free to center itself with respect to the coil 50 and the stationary section 44. In this instance this is accomplished by the use of a motion transmitting U-shaped frame 34 disposed to embrace both magnet sections 44 and 45 and having vertical legs loosely engaged in guide channels 58 formed by and between extended side edges 59 of the frame plates 46 and 47. The U-shaped frame shown is formed of a strip of metal having a central stiffening rib 60 which extends across the base of the frame as well as along both legs thereof. At a mid point along the base of the frame, the rib 60 bears against a bolt 61 fixed in supporting ears 62 on the armature section 45 to provide a freely flexing, single-point driving engagement between the section 45 and frame.

As hereinabove noted, the upper ends 33 of the frame 34 are in thrust engagement with the switch-carrying cross-head 26. It will of course be understood that when the armature section 45 is forced upwardly by energizing the coil 50, this motion is transmitted through the bolt 61 and frame 33 to the cross-head 26 to advance the switch contacts 27 and 28 into contact with the stationary contacts 16 and 17, respectively, to close the switch, and when the coil 50 is de-energized, the cross-head 26, frame 33 and armature section 45 fall by gravity to separate the switch contacts and open the switch. It will also be understood that when the contacts 27 and 28 are thus pressed against the contacts 16 and 17, the springs 37 are compressed so as to insure adequate pressure between the contacts, the springs 37 also serving to impart an initial downward impulse to the cross-head 26 during each downward switch-opening movement of the latter. An appropriate stop 63 mounted on the plate 10 coacts with the bolt 61 to limit the downward movement of the armature section 45 of the electromagnet.

The coil 50 of the electromagnet is energized from the main power circuit by including the same in a control circuit shunted across two of the binding posts 19. The coil 50 is controlled by appropriate switch mechanism disposed either within the housing 11 or outside of the housing at one or more remote stations, or by both. A pilot switch, particularly adapted for use within the housing, is shown in Figs. 7, 8 and 9. The switch therein shown is contained in a molded plastic housing 64 having integral mounting ears 65 projecting from the sides theerof, adapted to seat upon the inturned flanges 67 of a pair of appropriate bracket plates 68 fixed to and projecting from the mounting plate 10 at opposite sides of the electromagnet. The mounting ears 65 may be fixed to the flanges 67 by screws 66 or the like. A pair of stationary switch contacts 69 are carried by suitable mounting plates 70 within opposite lower corners of the housing 64, each being electrically connected through separate leads 71 to suitable binding posts 72 attached to the outside of the housing 64.

The stationary contacts coact with movable contacts 73, carried by the opposite ends of a bowed resilient bridge piece 74 of metal which is attached intermediate its ends to the outer end of a plate-like lever structure 75. The lever 75 is rockably supported intermediate its ends upon a shaft 76, fixed at its ends in the opposite side walls of the housing 64. An appropriate spring 77, acting on the inner end 78 of the lever 75 urges the same in such direction as to separate the movable contacts 73 from the fixed contacts 69. An actuating arm 79, projecting from a midpoint of the lever 75, has a bifurcated end carrying a pin 80 engaged in a slot 81 in one end of a rocket element 82 mounted upon a fixed pivot pin 83. The pin 83 spans a rectangular recess 84 formed in the base of a cylindrical socket member 85 which projects beyond the face of the housing 64.

The rocket element 82 and switch lever 75 are, in this instance, actuated by a single push button 86 axially movable within the socket member 85 and having a bifurcated shank 87 which straddles the rocker element 82 and having guide slots 88 in which the pin 83 is engaged. The push button 86 is urged outwardly by appropriate means, such as a spring 89. A dog 90 is rockably supported on a pin 91 between the legs of the shank 87, and a leaf spring 92 coacts with a flat face 93 on the rear end of the dog to yieldably retain the forward pointed end 94 thereof in the intermediate position shown. The end 94 of the dog projects toward a pointed projection 95 formed on the edge of the rocker element 82 between two V-shaped recesses 96 and 97 therein.

The arrangement is such that by depressing the push button 86, the pointed end 94 of the dog will enter one or the other of the recesses 96 or 97 and force the rocker element 82 to rock in one direction or the other, to thereby actuate the lever 75 and open or close the pilot switch. If the switch is open at the time that the push button 86 is depressed, the projection 95 will direct the pointed end 94 of the dog into the recess 96, causing the switch to close; and if the switch is closed, the projection 95 will direct the pointed end into the other recess 97, causing the switch to open.

The parts are preferably so proportioned and arranged that the pilot switch will not close except by depressing the button 86 downwardly into the socketed member below the projecting rim 98 thereof, so that the switch cannot be closed except by a deliberate act on the part of the operative, thereby avoiding accidental closing thereof. However, it is highly desirable, particularly in cases of emergency, that the switch be readily openable by pressure on the button 86, however applied, and for this reason the operating stroke of the button 86 for the switch opening operation is less than for the switch closing operation, the switch opening operation being completed before the button 86 has been depressed below the rim 98. Although this variation in operating stroke of the button 86 may be accomplished in various ways, in the device shown, the recess 96 is formed somewhat deeper than the recess 97 for that purpose.

Provision is also preferably made for indicating the open and closed condition of the pilot switch. In this instance a shallow rectangular depression 99 is provided in the face of the switch housing 64 with the words "Off" and "On" lettered on the base of the recess in vertically spaced relation. These words are alternatively exposed by a shutter plate 100 reciprocable over the base of the recess. This plate 100 is operatively connected to the switch lever 75 through appropriate means, such as a pair of fingers 101 carried by the inner end 78 of the switch lever and projecting through slots 102 into apertures 103 in the shutter plate. The arrangement is such that when the switch is open the shutter plate 100 is in such position as to expose to view the word "Off," as indicated in Figs. 7 and 8, and when the lever 75 is actuated to close the switch, the plate 100 is thereby shifted into position to expose the word "On."

Provision is also preferably made for automatically holding the pilot switch closed when the main switch is closed, and for this purpose a plunger 104 is provided reciprocably mounted in and projecting from the lower end of the housing 64. The outer end 105 of the plunger 104 projects into the path of travel of a resilient finger 106 carried by and projecting from the movable armature 45 of the electromagnet, as indicated particularly in Figs. 2 and 6. A coil spring 107 yieldably retains the plunger 104 in the projected position shown, but whenever the armature 45 moves upwardly to close the main switch, the spring finger 106 carried thereby engages and forces the plunger 104 upwardly against the end 78 of the switch lever 75 to yieldably hold the pilot switch closed.

It will of course be understood that whenever the armature 45 lowers to open the main switch, the plunger 104 is automatically withdrawn from the switch lever 75 by the action of the spring 107 to permit the pilot switch to open under the action of the spring 77; and it will also be understood that the pilot switch may be manually opened, to de-energize the coil 50, while the armature 45 is in its upper switch-closing position, the yieldability of the spring finger 106 permitting such action.

When the pilot switch above described is employed, the electrical connections are preferably as indicated in the diagram shown in Fig. 10. As therein shown, the electromagnet coil 50 is included in a control circuit 108 which is connected across two of the stationary contacts 16 and thereby permanently shunted across two sides of the power circuit. The pilot switch is also included in this control circuit through connections with the stationary switch contacts 69 thereof. The control circuit 108 also includes two normally closed overload switches 109, to be hereinafter described, either of which may open under certain predetermined conditions to thereby automatically de-energize the coil 50 and effect opening of the main switch.

The pilot switch shown in Figs. 11 to 14 is similar in many respects to that shown in Figs. 7, 8 and 9. It is contained within a molded housing 64' adapted to be arranged at any convenient control station remote from the housing 11. Two stationary switch contacts 69', separately connected to binding posts 72', coact with movable switch contacts 73' carried by the opposite ends of a resilient metallic bridge piece 74'.

In this instance the bridge piece 74' is carried by a plate-like lever 75' which is actuated and controlled by a single push button 86' through mechanism substantially the same as that employed in the pilot switch first above described, including the shank 87' of the push-button 86', the dog 99' carried thereby, the notched rocker element 82', and the arm 79' projecting laterally from a mid point of lever 75'. The lever 75' is biased toward switch opening position by a spring 77'. An indicator, including a reciprocable shutter plate 108', constructed and operated in the manner above described, is also preferably provided in order that the operative may know at a glance whether the switch is in open or closed condition.

The pilot switch shown in Figs. 11 to 14 is also equipped with means for yieldably retaining the same in closed condition so long as the coil 50 is energized, but in this instance this is accomplished electrically preferably in a manner such as will now be described. In this instance the housing 64' is extended to receive and house a suitable electromagnet having an energizing coil 110 connected in series with the energizing coil 50 of the electromagnetic actuator of the main switch. The coil 110 is shown surrounding and supported by one leg 111 of an L-shaped stationary magnet section 112. An L-shaped movable armature section 113, hingedly engaged with the section 112, has a leg 114 which is movable into contact with the leg 111 whenever the coil 110 is energized; and a suitable resilient connection is provided between the armature 113 and the switch actuating lever 75' through which the latter is urged toward switch-closing position whenever the coil 110 is energized. The resilient connection shown for this purpose includes a leaf spring 115 carried by the armature section 113 and having a bifurcated end 116 operatively engaged with a member 117 projecting from the lever 75'.

The arrangement is such that so long as the coil 50 is energized to hold the main switch closed, the coil 110 is also energized and the leg 114 of the armature 113 is thereby held in contact with the leg 111 of the stationary section 113 and the spring 115 is so tensioned as to urge the lever 75' toward switch closing position. However, by depressing the push button 86', the lever 75' may be actuated against the resistance of the spring 115 to thereby open the switch and de-energize both coils 110 and 50 so as to effect opening of the main switch.

Since the control of the pilot switch shown in Figs. 11 to 14 is in no way dependent upon mechanical connection between it and the operating mechanism of the main switch, it is well adapted for use at any convenient station outside of the main switch housing 11. Where so employed, and for convenience in making connections, a terminal panel 118 is preferably used, the latter being mounted upon the bracket plate flanges 67 within the main switch housing. As indicated particularly in Fig. 15, this panel is equipped with two binding posts 119, electrically connected through separate conductors 120 with two binding posts 121, respectively. The panel 118 provides a convenient means for connecting the pilot switch into the control circuit 108, the binding posts 119 being connected to the opposite sides, respectively, of that circuit, and the binding posts 121 being connected to the opposite sides 108', respectively, of the pilot switch, all as indicated particularly in Fig. 16.

From inspection of Fig. 16, it will be noted that whenever the pilot switch 69' is closed, both coils 110 and 50 are energized, the latter functioning through the armature 45 and frame 34 to close the main switch and the former functioning through the armature 113 to hold the pilot switch closed. As above noted, however, that the pilot switch 69' will open automatically when the control circuit 108 is de-energized, and also that the pilot switch 69' can be manually opened while the coil 110 is energized and, when so opened, both coils 50 and 110 are de-energized and the main switch opens automatically.

Since the pilot switch shown in Figs. 11 to 14 may be employed outside of the main switch housing 11, and since it may be opened or closed by pressure applied to a single control element 86', it may be readily converted into a remote control switch responsive to pressures however applied. In Fig. 17, for instance, it has been shown converted into a pendant switch capable of being either closed or opened by a gripping pressure applied by the hand of an operative. As therein shown, the pilot switch with its housing 64' has been mounted within a collapsible container in the form of an auxiliary housing 122 having a cover 124 hinged at 125 thereon. The cover is provided with a depression 126 or otherwise fashioned to bear against the control button 86', so that whenever the cover 124 is depressed the button 86' is actuated to close or to open the switch. The auxiliary housing is supported by a cable 127 containing the two-wire leads 108' and is of a size to be received within and encompassed by the hand of an operative, the arrangement being such that the switch may be closed or opened merely by grasping and gripping the housing and its cover within the operative's hand. The switch may also be operated to close or open the same by pressure applied to the cover in various other ways convenient to the operative. Such an arrangement is highly desirable, particularly in cases of emergency.

The pilot switch shown in Figs. 11 to 14 is well adapted for use in systems employing only one remote control station. For systems involving more than one control station, a control switch of the two-button type, such as shown in Figs. 18, 19 and 20 is preferred. The control switch therein shown is enclosed within an appropriate housing 128 having a suitable removable cover 129 perforated to accommodate two switch actuating push buttons 130 and 131. One of the push-buttons 130 is a "start" button operable to momentarily close a normally open switch and the other button 131 is a stop button operable to momentarily open a normally closed switch. Both switches and their actuating buttons are supported by a frame of novel construction, preferably such as will now be described.

The switch supporting frame shown comprises a base plate 132 of insulating material fixed to the bottom of the housing 128 by bolts 133 or the like. The opposite ends of the base plate are reduced to form tongues 134 which are closely fitted in and extend through appropriate slots formed in end plates 135 of like material disposed at right angles thereto. The end plates are fixed and braced by appropriate angle brackets 136 fixed thereto and anchored to the base plate by the bolts 133. A top plate 137 is supported by the end plates 135 parallel to and spaced from the base plate 132. The opposite ends of the top plate are reduced to form tongues 138 fitted in and extending through appropriate slots in the end plates 135.

The base plate 132 of the frame provides support for a pair of laterally spaced stationary contacts 139, each being fixed to an L-shaped conductor plate 140 having one leg riveted or otherwise attached, as at 141, to the top face of the base plate. The other leg of each conductor plate is laterally extended and carries a suitable binding post 142. The stationary contacts 139 cooperate with a pair of movable contacts 143 to form a normally open start switch, the contacts 143 being carried by the ends of a metallic bridge piece 144 suitably fixed to the shank 145 of a push button 130. The shank 145 extends through and is guided by the top and base plates 137 and 132, the end 146 of the shank being square and fitted in a square opening in the base plate 132 to prevent it from turning and to thereby hold the contacts 143 aligned with the contacts 139. A spring 147 urges the button 130 and shank 145 outwardly so that the contacts 139 and 143 are normally separated and the switch normally open.

The top plate 137 of the frame provides support for a pair of stationary contacts 148 carried by L-shaped conductor plates 149 similar to conductor plates 140, similarly attached to the under face of top plate 137, and similarly equipped by binding posts 150. And a metallic bridge piece 151 carried by the shank 152 of the push button 131 is provided with contacts 153 respectively aligned with contacts 148 and cooperating therewith to form a stop switch. The shank 152 is similarly guided by the plates 137 and 132, and a spring 154 urges the shank 152 outwardly so as to normally retain the contacts 148 and 153 engaged and thus normally retain the stop switch in closed condition.

An appropriate holding switch is preferably used in conjunction with the control switch just described. That shown in Figs. 21 and 22 has proven satisfactory for the purpose. It includes a molded housing 155 having mounting ears 156 by which it may be attached to the flanges 67 of the bracket plates 68 within the main switch housing 11. Within the housing 155 are two stationary contacts 157 each mounted on a bracket 158 fixed by a screw 159 or 160. The stationary contacts 157 coact respectively with a pair of movable contacts 161 on the opposite ends of a metallic bridge piece 162 carried by the squared shank 163 of a plunger 164 guided for lengthwise movement in a side wall of the housing 155. A pin 165 working in a slot 166 in the housing limits the stroke of the plunger 164. A reduced extension 167 of the plunger 164 is guided within the opposite side wall of the housing and a spring 168 thereon coacts with a collar 169 fixed on the plunger to urge the plunger outwardly and thus normally retain the switch in open position. A spring 170 on the plunger normally retains the bridge piece 162 against the collar 169, but permits the bridge piece to yield after the contacts 161 have been forced against the contacts 157 by the advance of the plunger 164.

When the housing 155 of the holding switch is mounted on the bracket plate flanges 67 in the manner above described, the projecting end of the plunger 164 lies within the path of travel of the finger 106 carried by the movable armature 45 of the main switch actuator, so that when the latter is actuated to close the main switch, the plunger 164 is engaged by the finger 106 and advanced to force the switch contacts 161 against the contacts 157 to thereby close the holding switch, the latter remaining closed so long as the main switch remains closed.

The screw 159 which serves to hold in place one of the brackets 158 and its contact 157 also serves as anchorage for an external conductor strip 171 having two binding posts 172 and 173 at opposite ends thereof, so that both binding posts are thus electrically connected to one of the stationary contacts 157. The other screw 160 provides anchorage for another conductor strip 174 having a binding post 175, so that the latter is electrically connected to the other stationary contact 157. The housing 155 of the holding switch is also preferably provided with two additional binding posts 176 and 177 electrically connected with each other through a conductor strip 178, but having no electrical connection with the switch contacts. The additional binding posts 176 and 177 serve merely to facilitate the wiring connections.

As previously noted, any number of control switches of the type shown in Figs. 18, 19 and 20 may be employed, one for each control station, and these are preferably connected through one holding switch substantially in a manner such as will now be described. For purposes of illustration, two control switches of this type are diagrammatically indicated in the wiring diagram shown in Fig. 23. As indicated therein, one side of the control circuit 108, containing the main coil 50, is connected to the binding post 176 on the holding switch housing 155, while the other side of the control circuit 108 is connected to the binding posts 172 and through it to one of the start switch contacts 139 of both of the control switches 128 and also to one of the stationary contacts 157 of the holding switch. The other start switch contact 139 of one of the control switches is connected through the binding post 175 to the other stationary contact 157 of the holding switch, while the corresponding contact 139 of the other control switch is connected through a lead 179 to one of the stop switch contacts 148 of the first named control switch. The corresponding contact 148 of the other control switch is connected through a lead 180 and the binding posts 177 and 176 to the first named side of the control circuit 108. The other stop switch contact 148 of each control switch is connected through a lead 181 with the second named start switch contact 139 of each.

The arrangement is such that whenever the start switch 139 of either control switch is closed by pressure applied to either button 130, the control circuit 108 is closed through the stop switches 148 and coil 50, to thereby energize the latter and cause the main switch to close in the manner above described. And as the main switch closes, the finger 106 acts on the plunger 164 of the holding switch 157 to close the same, to thereby maintain the control circuit closed after the actuated start switch has reopened after releasing the pressure from its button 139. Thereafter, whenever the stop switch 148 of either control switch is opened by pressure applied to its control button 131, the control circuit 108 is thereby opened, to thereby de-energize the coil 50 and open the main switch. As the main switch opens the finger 106 moves to relieve the pressure against the plunger 164 of the holding switch 157 and the latter opens automatically.

Provision is preferably made for effecting automatic opening of the main switch in the event of an overload in the work circuit. That is the purpose of the overload switches 109 diagrammatically indicated in Figs. 10, 16 and 23. They may assume various forms but, as shown in Figs. 3 and 24, each includes a stationary contact 109' and a coacting movable contact 182 disposed within a cavity 183 of a molded block 184. In this instance there are two such switches, the housing block 184 of each being attached by a screw 185 or otherwise to one of the bracket plates 68 in the main switch housing 11.

The stationary contact 109' of each switch is carried by a conductor bracket 186 anchored to the block 184 by a screw 187 and having an end projecting beyond the block and equipped with a binding post 188. The coacting movable contact 182 is carried by one end of a lever 189 whose other end terminates in a pair of spaced legs 190 fulcrumed on separate laterally spaced upstanding ears 191 formed on a conductor bracket 192. The bracket 192 is anchored to the block 184 by a screw 193 and is equipped with a binding post 194 on its projecting end. The contact 182 is actuated and controlled by an arched tension spring 195 connected at one end to the lever 189 and at its other end to the free end of a lever 196, the other end of lever 196 terminating in a pair of spaced legs 197 fulcrumed on a second pair of separate laterally spaced upstanding ears 198 formed on the bracket 192. The spacing of the ears 191 is such as not to interfere with the swinging action of the lever 196, and the spacing of the ears 198 is such as not to interfere with the swinging action of the lever 189. Each switch 109' is included in the control circuit 108 through appropriate connections to the binding posts 188 and 194.

The line of tension of the spring 195 is normally disposed on the same side of the fulcrum points of both levers 189 and 196 and therefore normally urges both levers to move in the same direction and in such direction as to hold the contact 182 against contact 109'. However, whenever the lever 196 is swung so as to shift the line of tension of the spring 195 to the other side of the fulcrum point of lever 189, the latter instantly swings in such direction as to move the contact 182 from contact 109' with a snap action, and when the lever 196 again moves toward its normal position the contact 182 is again snapped closed against the contact 109' the instant that the line of tension in the spring 195 passes back through or to the first named side of the fulcrum point of the lever 189.

Provision is made for rendering each of the switches 109 responsive to an overload condition in one side or another of the work circuit. This is accomplished in this instance by rendering the lever 196 responsive to a bi-metallic thermal strip 199 which in turn responds to the temperature of an adjacent resistance coil 200 which is connected in one side 201 of the work circuit. The thermal strip 199 and coil 200 are shown arranged side by side in a cavity 202 formed in the block 184 and closed by a cover plate 203 of insulating material removably attached to the block by end screws 204 or the like. The coil 200 is fixed in place by the screws 204 and electrically connected within one side of the work circuit through suitable terminals 205 at opposite ends thereof. The thermal strip 199 is supported at one end by a suitable bracket 206, adjustably mounted within the block 184 by screws 207 and 208, and bears at its other end against a thrust pin 209 lengthwise movable within the block and bearing against the end of the lever 196.

The arrangement is such that in the event of an overload in the work circuit the thermal strip 199 will flex in response to the heat developed in the coil 200 and force the pin 209 and lever 196 in such direction as to cause the switch contact 182 to withdraw from contact 109' with a snap action in the manner above described, to thereby break the control circuit 108 and cause the main switch to open. The degree of temperature and consequently the degree of overload at which this action will occur may be regulated by adjustment of the bracket 206, and this may be accomplished by adjusting one or both of the screws 207 or 208.

Each overload switch 109 is preferably so constructed and arranged that it will not automatically reclose after it has opened in response to an overload condition, so as to prevent reclosing of the main switch until opportunity has been had to discover and correct the cause of the overload. For that purpose the contact carrier lever 189 is normally permitted an opening movement so extensive that when that lever is in full switch-open position the movement of the lever 196 is insufficient to shift the line of action of spring 195 through and past the fulcrum point of the lever 189 and thus unable to effect a closing action of the lever 189. To effect such a closing action, a manual reset mechanism is provided for each switch. Mechanism well adapted for that purpose is shown in Figs. 3 and 4.

Each reset mechanism shown comprises a thrust pin 210 which projects into the cavity 183 behind the free end of the contact carrier lever 189. The pin 210 normally assumes a retracted position toward which it is urged by a spring 211. The pin 210 bears outwardly against a rocker plate 212 fulcrumed on a screw 213 fixed in the bottom of the switch block 184. A plunger 214 is operable to tilt the rocker plate 212 in such direction as to thrust the pin 210 further into the cavity 183 toward the position shown in Fig. 3 so as to advance the switch lever 189 from a full open position into or toward the closed switch position shown in said figure. Each plunger shown at 214 comprises a flat strip of Bakelite confined between the switch block 184 and its supporting bracket plate 68 and guided within a channel formed in the rear face of the block 184.

If desired, the reset plungers 214 may be adjustably positioned so as to hold the pin 210 in an advanced position, to thereby limit the outward swing of the contact carrier lever 189 to a point from which it may automatically swing inwardly to close the overload switch whenever the lever 196 is returned to switch-closing position. For that purpose each plunger 214 is slotted to receive a clamp screw 215 carried by a stationary clamp 216. By virtue of this arrangement, either or both of the reset plungers 214 may be releasably retained by its clamp screw 215 in an inwardly advanced position, so as to limit the outward swing of the lever 189 by the advanced position of the thrust pin 210 maintained by the advanced plunger.

In order that the thermal unit 199 of each overload switch 109 may be isolated from external conditions and thereby substantially uninfluenced by temperatures other than those developed by the adjacent resistance element 200, the side of each supporting block 184 is preferably covered by an appropriate side panel 217, attached thereto by screws 218 or the like, and removable to provide ready access to the housed parts.

Provision is preferably made for the simultaneous operation of both reset plungers 214 by means operable outside of the main housing 11. In this instance the means for that purpose comprises two resilient metal strips 219 (Fig. 2) each overlying the end of one of the plungers 214 and each attached at one end 220 to the inner face of the housing cover. The opposite free ends of these strips are connected by a cross-bar 221. A push-button 222, fixed to the cross-bar 221 substantially midway between the strips 219, normally projects through an appropriate opening 223 in the housing cover.

The arrangement is such that by depressing the push-button 222 both strips 219 may be forced inwardly in a manner to simultaneously depress both plungers 214 and thereby insure closing of both overload switches 109 in the above-described manner.

Various changes may be made in the invention herein above specifically described without departing from or sacrificing the advantages of the invention as defined in the appended claims.

I claim:

1. In an electromagnetic controller the combination of a main switch, electromagnetic means for actuating the same, a control circuit for said means, said circuit including a control switch operable to close said circuit and thereby energize said means, means biasing said control switch toward open circuit position, and other electromagnetic means responsive to energization of said first named means and operable upon said control switch to maintain said circuit closed.

2. In an electromagnetic controller the combination of a main switch, electromagnetic means for actuating the same, a control circuit for said means, said circuit including a single switch operable to make and break said circuit and biased toward circuit breaking position, and other electromagnetic means responsive to energization of said first named means for holding said last named switch in circuit making position.

3. In an electromagnetic controller the combination of a main switch, electromagnetic means for actuating the same, a control circuit for said means including a single switch operable to make and break said circuit and biased toward open position, and other electromagnetic means responsive to energization of said first named means for holding said last named switch closed, said last named means including connections yieldable to permit manual opening of said last named switch against the holding action of said last named electromagnetic means.

LYLE BEEMAN.

REFERENCES CITED

The following references are of record in the file of this patent:

UNITED STATES PATENTS

| Number | Name | Date |
|---|---|---|
| 1,051,219 | Grabau | Jan. 21, 1913 |
| 1,491,396 | Hall | Apr. 22, 1924 |
| 1,513,247 | James | Oct. 28, 1924 |
| 1,530,929 | Brobst | Mar. 24, 1925 |
| 1,714,085 | Getchell | May. 21, 1929 |
| 1,726,233 | Krantz | Aug. 27, 1929 |
| 1,763,284 | White | June 10, 1930 |
| 1,893,827 | Getchell | Jan. 10, 1933 |
| 1,912,610 | Widmer | June 6, 1933 |
| 1,981,534 | Wilms et al. | Nov. 20, 1934 |
| 1,986,445 | Parsons et al. | Jan. 1, 1935 |
| 1,997,550 | O'Leary | Apr. 9, 1935 |
| 1,998,810 | Getchell | Apr. 23, 1935 |
| 2,013,013 | Van Valkenburg | Sept. 3, 1935 |
| 2,087,895 | Bierenfeld | July 27, 1937 |
| 2,134,593 | Wulsten | Oct. 25, 1938 |
| 2,254,768 | Bierenfeld | Sept. 2, 1941 |
| 2,261,632 | Rosing et al. | Nov. 4, 1941 |
| 2,307,776 | Grant et al. | Jan. 12, 1943 |
| 2,318,095 | Putman | May 4, 1943 |
| 2,335,888 | Stilwell | Dec. 7, 1943 |
| 2,371,601 | Beeman | Mar. 20, 1945 |